May 11, 1943. R. C. GRIFFITH 2,318,852
POWER TRANSMISSION
Filed March 16, 1938
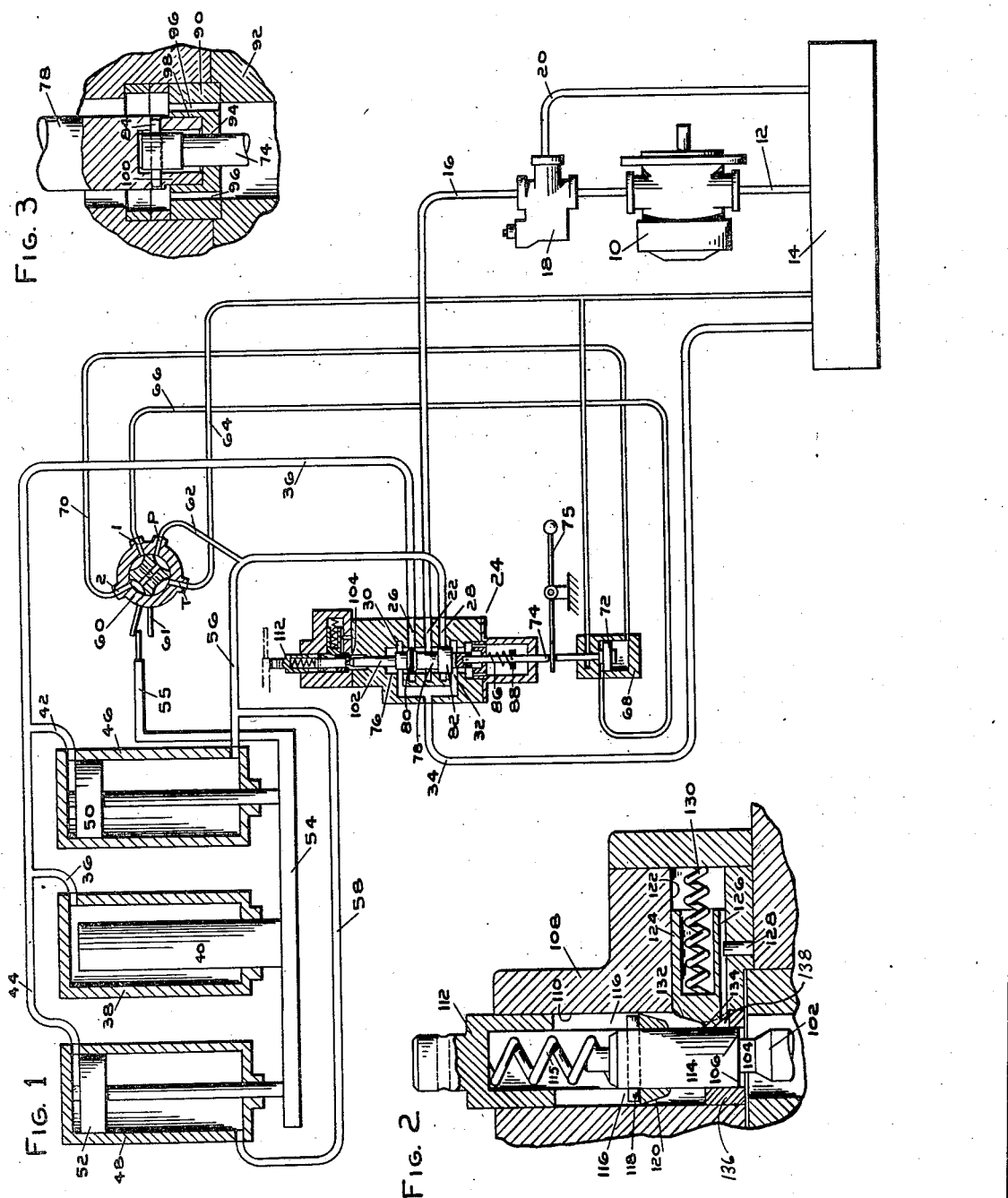
INVENTOR
RAYMOND C. GRIFFITH
BY Ralph L. Tweedale
ATTORNEY Patented May 11, 1943

2,318,852

UNITED STATES PATENT OFFICE 2,318,852

POWER TRANSMISSION

Raymond C. Griffith, Detroit, Mich., assignor to Vickers Incorporated, Detroit, Mich., a corporation of Michigan Application March 16, 1938, Serial No. 196,121

2 Claims. (Cl. 60—52)

This invention relates to power transmissions and more particularly to those of the fluid type wherein a power transmitting fluid, such as oil, and hereinafter referred to as such, is utilized for the transmission of power between one or more pumps and one or more motors.

This invention is particularly concerned with a hydraulic transmission system for operating a press or other reciprocating work machine wherein it is desired to move the working member forwardly on a work stroke, in response to manual initiation, to automatically reverse the work member at the completion of the forward stroke, and to automatically stop the work member at the end of the return stroke.

It has been customary heretofore in hydraulic transmissions for operating presses to utilize a spring-biased, four-way valve for starting, stopping, and reversing the flow of fluid to the press operating motors and to provide the valve with a spring bias in one direction, and with a latch for holding the valve in one extreme position against the bias. The valve may then be manually operated to latched position which causes a flow of fluid to the main ram for performing the forward pressing stroke. At the completion of the forward stroke either the movement of the press platen or the pressure developed as the platen bottoms is utilized to release the latch permitting the valve to shift to its opposite position under its spring bias, thereby reversing the flow of fluid and returning the platen to open position. As the end of the return stroke is reached the movement of the platen is utilized to operate the valve to center or press-stopping position.

Considerable difficulty has been experienced with press operating systems of this character since the valve depends for its operation at the end of the cycle upon movement of the press. On the other hand, as soon as the valve approaches the position where fluid flow is cut off, no more movement of the press can take place to insure complete closing of the valve. Attempts to avoid this difficulty have heretofore made use of complicated snap acting mechanism or have endeavored to balance one spring against another with ensuing trouble due to wear, varying friction in the valve, varying viscosity of the oil, varying spring characteristics etc.

It is an object of the present invention to provide a power transmission system, particularly adapted for operating a press in which the above difficulties are avoided.

A further object is to provide an improved valve of simple and reliable construction providing a novel detent mechanism and incorporating, as well, an improved and simplified dashpot construction for cushioning the movement of the valve member when the latch is tripped.

Further objects and advantages of the present invention will be apparent from the following description, reference being had to the accompanying drawing wherein a preferred form of the present invention is clearly shown.

In the drawing:

Figure 1 is a diagrammatic view of a power transmission system incorporating a preferred form of the present invention.

Figure 2 is an enlarged sectional view showing the latch mechanism of a valve incorporated in Figure 1.

Figure 3 is an enlarged view of the dashpot mechanism of the valve, showing the parts in a different position.

A pump 10 adapted to be driven by a suitable prime mover, not shown, withdraws oil through a suction conduit 12 from a tank 14 and delivers the same through a pressure conduit 16. The latter has a relief valve 18 incorporated therein for by-passing oil to the tank through a by-pass conduit 20 whenever a predetermined pressure is exceeded in the line 16. The conduit 16 leads to the pressure port 22 of a four-way valve 24. Adjacent the pressure port 22 are a pair of cylinder ports 26 and 28 while beyond these ports are tank ports 30 and 32. The tank ports 30 and 32 communicate with the tank by a conduit 34. Port 26 leads by a conduit 36 to the head end of a main press cylinder 38, having a main ram 40 reciprocably mounted therein. Conduit 36 also has branches 42 and 44 extending to the head ends of a pair of push back cylinders 46 and 48, having pushback pistons 50 and 52. The ram 40 and pistons 50 and 52 are connected to the press platen indicated at 54 in the well known manner. The rod ends of the cylinders 46 and 48 connect by conduits 56 and 58 with the port 28 of the valve 24. The platen 54 carries a trip arm 55 for operating the control valves, later to be described.

Stationarily mounted on the frame of the press is a rotary, four-way, pilot valve 60, having a pressure port P which connects by a conduit 62 with conduit 56. The tank port T of the valve 60 connects by a conduit 64 with the tank 14. Cylinder port 1 of the valve 60 connects by a conduit 66 with the rod end of a stationary cylinder 68 mounted in line with the valve 24. Cylinder port 2 of the valve 60 connects by a conduit 70 with the head end of cylinder 68. The cylinder 68 contains a piston 72 having a stroke just great enough to move the stem 74 from its extreme downward position up to its mid-position, illustrated. A lever 75 lies between the stem of piston 72 and the stem 74 and may be used to lift the stem 74 to the top of its stroke. The valve 60 has an operating fork 61 which is adapted to be shifted by the arm 55 as the latter approaches and leaves the top of the press stroke.

The valve 24 has a cylinder bore 76 into which the ports 22, 26, 28, 30 and 32 open and in which is slidably mounted a spool 78 having piston heads 80 and 82 thereon, adapted to control communication between the ports in the well known manner. In its central position, illustrated, the spool 82 blocks the port 28 while the spool 80 being narrower in width than the port 26, permits communication between the ports 22, 26 and 30. With the spool moved downwardly port 28 is opened to port 22 while port 26 is opened to port 30 only. With the spool moved upwardly the reverse connections are established. The spool 78 carries the stem 74 by a loose pin connection at 84 which permits a slight degree of radial play between the spool and the stem. Surrounding the stem 74 is a compression spring 86 which abuts at its lower end a collar 88 pinned to the stem 70. The upper end of the spring 86 abuts a transverse washer-like member 90, mounted between the body 24 and the end-cap 92, which is secured to the body by suitable bolts, not shown. The member 90 is provided with a through-hole 94 through which the stem 74 extends with a considerable degree of clearance and is also provided with one or more small transverse holes 96 extending from one side to the other thereof. About the hole 94 there is provided an enlarged bore 98 adapted to receive the piston-like end 100 of the spool 78.

At its upper end the spool 78 is provided with an integral stem portion 102 which is reduced as at 104 to form a shoulder 106, see Fig. 2. An end-cap 108 is mounted on the body 24 on its upper end and has a bore 110 within which is slidably mounted a hollow sleeve-like member 112, which, at its lower end surrounds the end portion 114 of the stem 102. The sleeve 112 is provided with diametric slots 116 in which a pin 118, secured to the stem 114 may freely slide. A compression spring 115 is interposed between the stem 114 and the sleeve 112. At its lower end the sleeve 112 is provided at a conical cam surface 120. Freely slidable in a bore 122 in the cap 108 is a cylindrical detent 124 having a keyway 126, which may slide on a stationary pin 128. A spring 130 normally urges the detent to the left in Fig. 2. The detent 124 is provided with an upwardly facing cam surface 132 co-operating with the conical cam surface 120. A shoulder 134 is adapted to engage the shoulder 106 when the latter moves upwardly a sufficient distance to permit the detent 124 to move to the left. A stop washer 136 having a cut-out portion 138 to clear the detent 124 is positioned in the bottom of the bore 110 and forms a guide for the stem portion 114.

In operation, starting with the parts in the position shown in Figures 1 and 2 and with the pump 18 operating, oil is delivered from the conduit 16 through the port 22 and returns to the tank, by-passing around the piston 80 at the port 26 and flowing through the port 30 and conduit 34 to the tank. The pump is thus by-passed at substantially zero pressure while the oil in the rod ends of the cylinders 46 and 48 is under a pressure created by the weight of the platen 54 due to the blocking of port 28.

When it is desired to start the press downwardly the lever 75 is operated to raise the stem 74 against the spring 86, causing the detent 124 to engage its shoulder 134 beneath the shoulder 106. Oil is thereby directed from pressure line 16 through ports 22 and 26 and conduits 36, 42 and 44 to the head ends of the cylinders 38, 46 and 48. The platen 54, accordingly, descends, forcing oil out of the rod ends of cylinders 46 and 48 through conduits 56 and 58, ports 28 and 32 and conduit 34 to the tank. As the platen reaches the bottom of its stroke the arm 55 contacts the sleeve 112, as shown by dotted line, pushing the latter downwardly against the spring 115 until the cam surface 120 by its co-action with the cam surface 132 retracts the detent 124. When this occurs the spring 86 is permitted to expand and the spool 78 moves downwardly to its extreme bottom position. As the spool approaches bottom position, the piston portion 100 enters the bore 98, trapping oil therein which is permitted to escape through the clearance between stem 74 and the hole 94, returning to the port 32 through the holes 96. This path may be given any suitable resistance so that the last movement of the valve is hydraulically cushioned against shock.

In its lowermost position the valve 24 connects the pressure conduit 16 through ports 22 and 28 and conduits 56 and 58 to the rod ends of the push-back cylinders 46 and 48. The platen, accordingly, moves upwardly discharging oil from the head ends of the three cylinders into conduit 36 and through ports 26 and 30 to the tank conduit 34. As the platen approaches its upper limit of movement, the arm 55 contacts the fork 61, shifting the valve 60 clockwise into the position shown on the drawing.

A portion of the pressure oil from the conduit 56 passes through branch conduit 62, ports P and 2 and conduit 70 to the head end of cylinder 68. The piston 72, accordingly, moves upwardly, shifting the valve stem 74 and the valve spool 78 to the middle position illustrated. The weight of the platen and associated parts maintain sufficient pressure in the line 56 after valve 24 has centered to hold the piston 72 in its upper position.

It will be seen that the valve spool 78 is positively moved to middle position and that considerable overlap of the piston 82, with the bore 76 at the upper edge of port 28, may be allowed, thus providing for ample sealing of the oil beneath the piston 50 and 52. The point at which the piston 82 just closes the port 28 may be made to occur a little earlier than the point at which the spool 80 just begins to open port 22 to port 26 if desired, thus insuring that pump pressure will be available to operate the push-back pistons 50 and 52 right up to the point at which they become blocked. Obviously, while the pilot circuit is shown as receiving oil from the push-back cylinder line 56, the same could be connected to any other supply of oil such as the line 16 or an independent supply of oil or other pressure fluid.

While the form of embodiment of the invention as herein disclosed, constitutes a preferred form, it is to be understood that other forms might be adopted, all coming within the scope of the claims which follow.

What is claimed is as follows:

1. In a fluid power transmission system the combination of a source of pressure fluid having high and low pressure sides, hydraulic motor means operable by fluid from said source on either a forward stroke or a return stroke and subject to a continuous biasing force in a forward direction, directional control means for directing the flow of fluid from said source to the motor for operating said motor on a forward or on a return stroke, or for stopping the motor, said directional control means being progressively movable between three positions in the first of which the fluid is directed to the motor for a forward stroke, in the middle one of which the fluid flow to or from the motor is cut off and the pump is unloaded and in the third of which the fluid is directed to the motor for a return stroke, means biasing the control means to the third position, means for shifting the control means to the first position, a fluid motor for moving the control means to the middle position, and a pilot valve controlled by the hydraulic motor at the end of a return stroke to direct fluid to operate said fluid motor for moving said control means to its middle position, said fluid motor being operated by fluid placed under pressure in the return side of the hydraulic motor by the biasing force acting on said hydraulic motor.

2. An improved operating system for a hydraulic motor of the type having a working member, hydraulic means for advancing said member, hydraulic means for retracting said member, and a source of operating fluid under pressure, which comprises the combination therewith of a main valve having a chamber, and a valve element movable back and forth in said chamber along a selected path, said element having lands spaced apart in a direction along said path, said casing having ports connected in groups by the spaces between said lands and covered and uncovered by the lands as they pass, one of said ports being connected to said advancing means, another to said retracting means, another disposed between these two and connected to said source, others beyond both of said first two ports and connected to exhaust, means operable on said element and urging it yieldingly into one end position in which it connects said retracting means to said source and said advancing means to exhaust, and holding it yieldingly in that position, a hydraulic device having a piston normally inoperative to oppose movement of said element into said one end position, but movable under hydraulic pressure into a position in which it releasably limits movement of said element under the action of said urging means to an intermediate position in which a land closes said port connected to said retracting means and said source port and said port connected to said advancing means are connected to exhaust, means including a valve controlled by said member and operable to connect said retracting means to said hydraulic device and cause said movement of said piston when said member is retracted within a selected extent and to disconnect said retracting means from said hydraulic device when said member is away from said selected extent of retraction, and means for moving said element into the opposite end position in which it connects said source to said advancing means and said retracting means to exhaust and holds said element releasably in that end position.

RAYMOND C. GRIFFITH.